(No Model.)  5 Sheets—Sheet 1.

J. PARK.
MACHINE FOR CUTTING DOUGH.

No. 574,934. Patented Jan. 12, 1897.

WITNESSES:

INVENTOR:
JAMES PARK,
BY Fred'k C. Fraentzel,
ATTORNEY (No Model.) 5 Sheets—Sheet 2.

J. PARK.
MACHINE FOR CUTTING DOUGH.

No. 574,934. Patented Jan. 12, 1897.

WITNESSES:
Marcy Z. Drusdell
Wm. H. Canfield Jr.

INVENTOR:
JAMES PARK,
BY
Fred C. Fraentzel,
ATTORNEY.

(No Model.) 5 Sheets—Sheet 3.

J. PARK.
MACHINE FOR CUTTING DOUGH.

No. 574,934. Patented Jan. 12, 1897.

WITNESSES:

INVENTOR:
JAMES PARK,
BY Fred F. C. Graentzel,
ATTORNEY

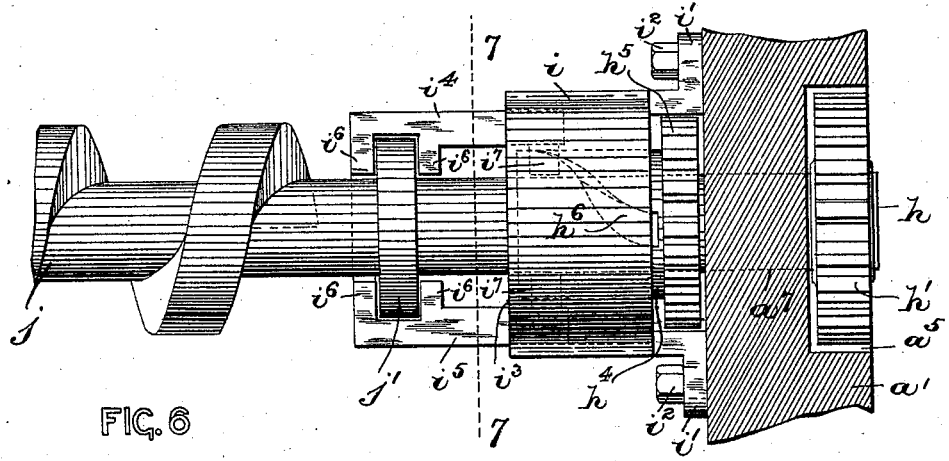
J. PARK.
MACHINE FOR CUTTING DOUGH.
No. 574,934. Patented Jan. 12, 1897.

(No Model.) 5 Sheets—Sheet 5.
J. PARK.
MACHINE FOR CUTTING DOUGH.

No. 574,934. Patented Jan. 12, 1897.

WITNESSES:
INVENTOR:
JAMES PARK,
BY
Fred'k C. Fraentzel,
ATTORNEY

UNITED STATES PATENT OFFICE.

JAMES PARK, OF NEWARK, NEW JERSEY.

MACHINE FOR CUTTING DOUGH.

SPECIFICATION forming part of Letters Patent No. 574,934, dated January 12, 1897.

Application filed June 24, 1896. Serial No. 596,671. (No model.)

*To all whom it may concern:*

Be it known that I, JAMES PARK, a citizen of the United States, residing at Newark, in the county of Essex and State of New Jersey, have invented certain new and useful Improvements in Machines for Cutting Dough; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a novel construction of machine for use in bakeries to deliver portions of dough of a certain weight prior to such portions being kneaded into proper shape by the baker to produce loaves of bread, rolls, or the like.

The invention therefore has for its primary object to provide a machine for the purpose stated into which the dough is fed from a hopper and forced from the machine through a peculiarly-shaped mold or former, where the dough is cut into portions, all of the same weight, by means of a rotary cutter or knife.

The novel construction of the machine is illustrated in the accompanying sheets of drawings, and the following description indicates the mode of operation, while the claims appended thereto specify those features which are new.

The invention therefore consists in the novel construction of dough cutting and forming machine hereinafter fully set forth, and in the novel arrangements and combinations of parts, which are described in the accompanying specification and finally embodied in the clauses of the claim.

The main feature of the machine is its simplicity of construction and its adaptability in forming portions of dough of any desired size and weight, such portions of dough being rapidly delivered from the discharge-opening in the machine for convenient handling by the baker prior to placing them in the baking-pans.

Figure 1:
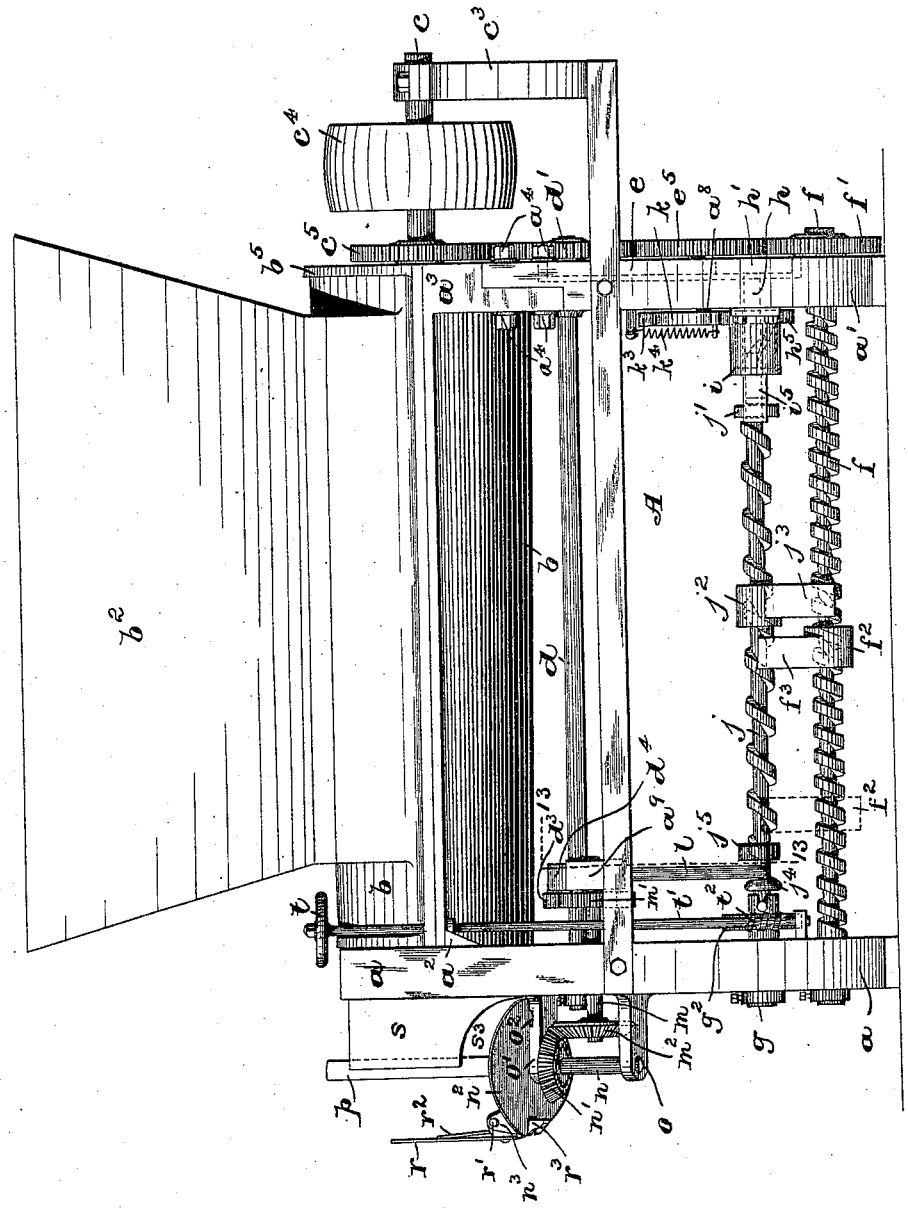
Figure 3:
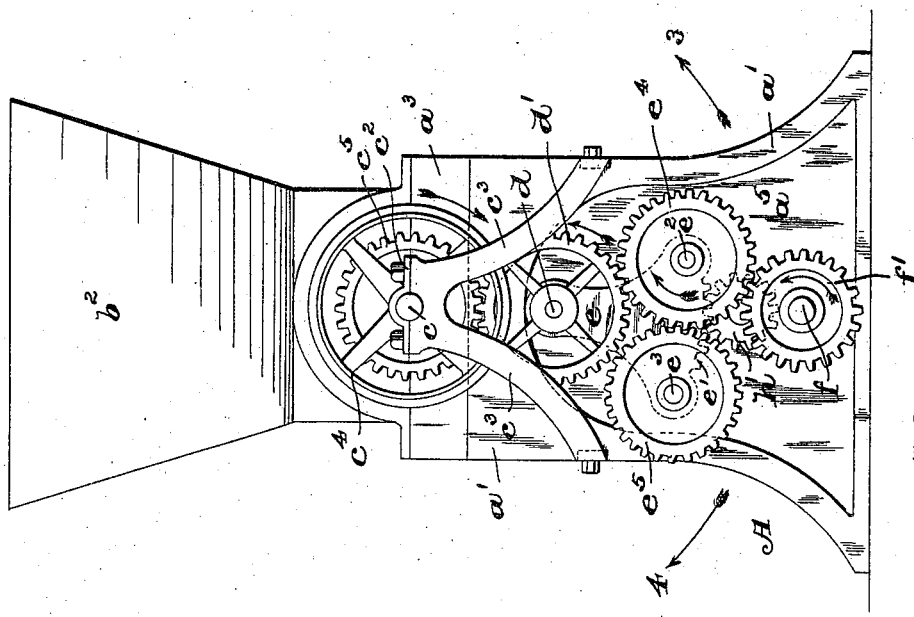
Figure 2:
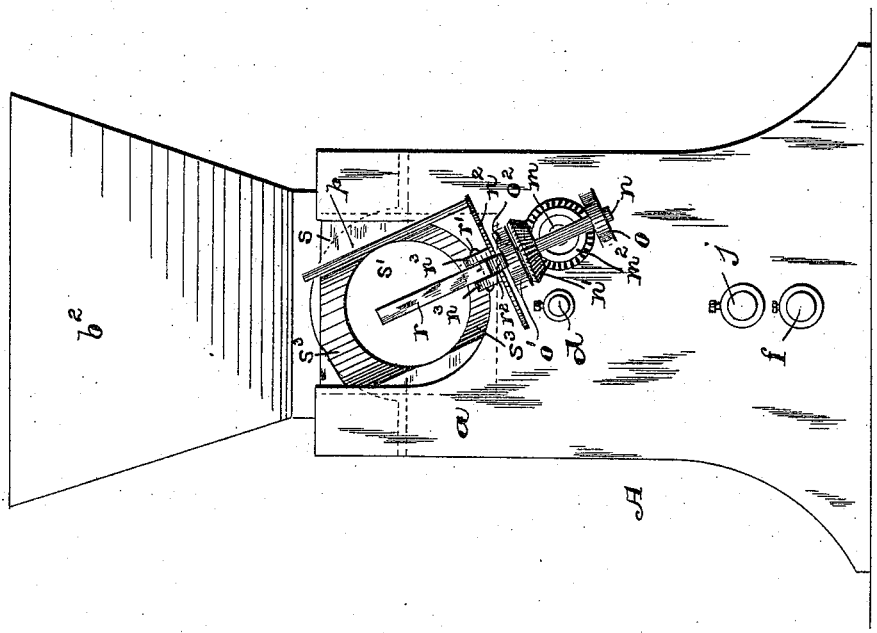
Figures 4, 5:
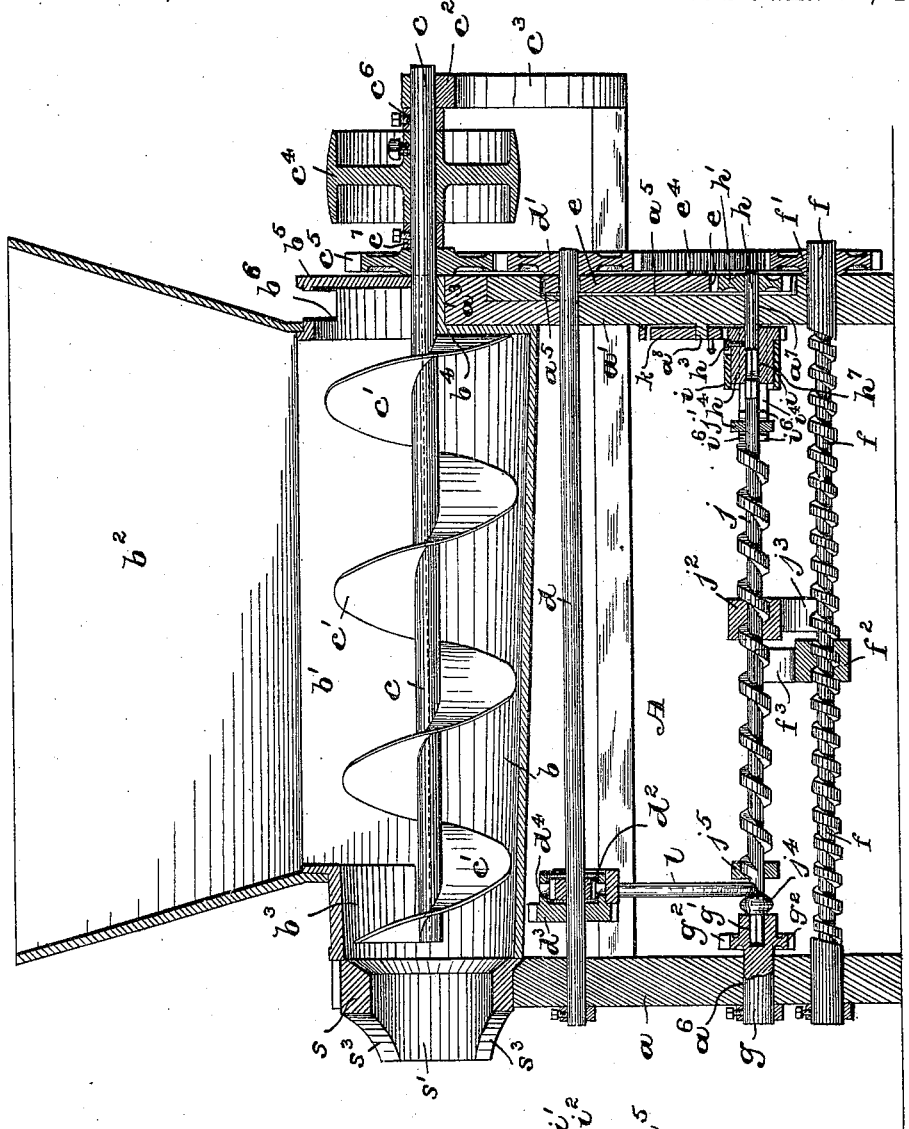
Figure 10:
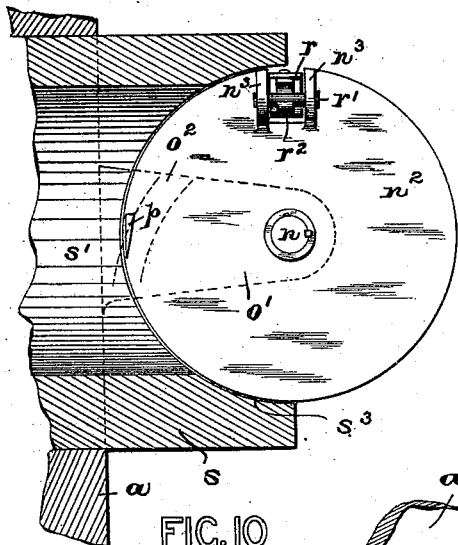
Figure 11:
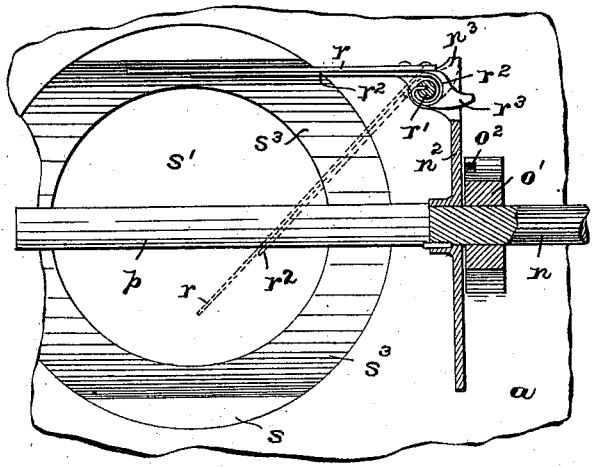
Figure 12:
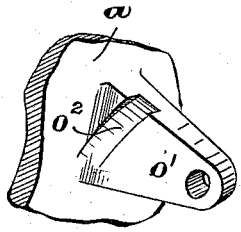
Figure 13:
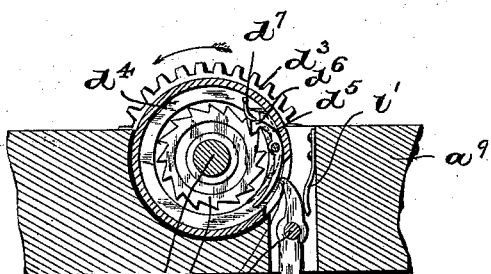
Figure 14:
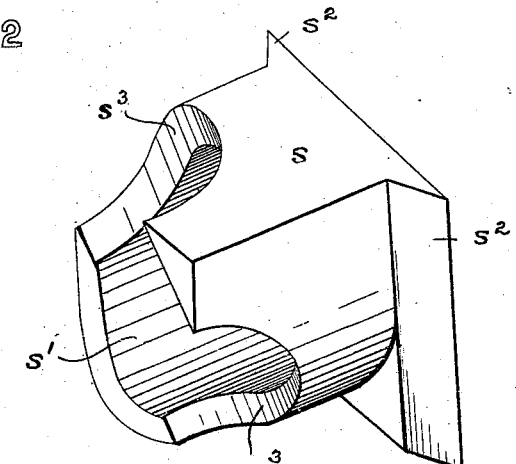

In the accompanying drawings, Figure 1 is a front view of my novel construction of machine, and Figs. 2 and 3 are the two end views of the same. Fig. 4 is a longitudinal vertical section of the machine, and Fig. 5 is a detail view of a regulating device for controlling the gear mechanism at one end of the machine. Fig. 6 is a detail view, on an enlarged scale, of one end of a controlling-shaft for regulating the cutting action of a knife or cutter connected with the machine. Fig. 7 is a vertical cross-section taken on line 7 7 in said Fig. 6, and Fig. 8 is a perspective view of a cam-sleeve and gear for actuating the controller-shaft which actuates said knife or cutter. Fig. 9 is a similar view of a toothed sector connected with the gear mechanism illustrated in Fig. 3. Fig. 10 is a face view of a rotary disk to which the knife or cutter is secured, illustrating in connection therewith a device for forcing the cut portion of dough from in front of the discharge-opening in the machine, said opening being represented in longitudinal vertical section. Fig. 11 is a front view of the discharge-opening, illustrating in connection with said view said rotary disk and its bearing in vertical section and the knife and dough-forcing device in elevation. Fig. 12 is a perspective view of the bearing in which the cutter-carrying disk is supported, illustrating in connection therewith an eccentrically-arranged groove for actuating a cam-lever or spur connected with the dough-forcing device. Fig. 13 is a vertical section taken on line 13 13 in Fig. 1, and Fig. 14 is a perspective view of the discharge-opening of the machine.

Similar letters of reference are employed in all of the above-described views to indicate corresponding parts.

In said drawings, A designates a suitable frame or support of the machine, comprising therein two standards $a$ and $a'$. Supported on a pair of lugs $a^2$, or any other well-known means, connected with the standard $a$ and in the bearing portion $a^3$ in the standard $a'$, as will be clearly seen from an inspection of Figs. 1 and 4, is a suitable casing or shell $b$, provided with an opening $b'$, above which I have arranged a hopper $b^2$. One end of said casing $b$ is open, as at $b^3$, to provide a discharge-opening, but the other end is closed by the pieces $b^4$ and $b^5$, said portion $b^4$ resting firmly in the bearing portion $a^3$ of said standard $a'$ and said pieces $b^4$ and $b^5$ forming a bearing for a conveyer-shaft $c$, provided with a suitable conveyer or worm $c'$ in the shell or casing $b$, substantially as illustrated in said Fig. 4. There is also an opening $b^6$ for the escape of any gases arising from the dough as it is fed into the casing $b$ from the hopper above the same. The free end of said shaft $c$ is arranged in a suitable bearing $c^2$ in a bracket $c^3$, secured on the outer side of the standard $a'$ of the machine in the manner illustrated in Figs. 1, 3, and 4, and on the said shaft $c$ are secured a driving-pulley $c^4$ and a gear-wheel $c^5$. Any longitudinal sliding movement of said shaft $c$ is prevented by means of suitable collars $c^6$ and $c^7$. As illustrated, the bearing portion $a^3$, hereinabove mentioned, is securely fastened on the standard $a'$ of the machine by bolts $a^4$. Meshing with said gear-wheel $c^5$ is a gear $d'$, which is securely fastened on the end of a shaft $d$, suitably journaled in bearings in the two standards $a$ and $a'$ of the machine. Loosely arranged on said shaft $d$ in a recessed part $a^5$ of the standard $a'$ is a sector $e$, provided with gear-teeth $e'$ and two arbor or journal pins $e^2$ and $e^3$, as more clearly illustrated in Fig. 9. On the pin $e^2$ of said sector is loosely arranged a pinion $e^4$, which is normally in mesh with a gear-wheel $f'$, fixed on the end of a screw-threaded shaft $f$, adapted to rotate in suitable bearings in said standards $a$ and $a'$ of the frame A of the machine. On the other arbor or journal pin $e^3$ of said sector $e$ is loosely arranged an idle-pinion $e^5$, which is in constant mesh with the pinion $e^4$ and operates in the manner to be fully set forth hereinafter.

Movably arranged on the screw-threaded shaft $f$ is a slide $f^2$, having the forked end $f^3$. Said slide is provided with a screw-threaded perforation and works in the manner of a nut on said shaft $f$, moving in opposite directions thereon, according to the direction of rotation of the said shaft $f$.

In a bearing portion $a^6$ in the standard $a$ is a short spindle or arbor $g$, provided with a toothed wheel portion $g^2$, and also having a squared socketed portion $g'$, as clearly illustrated in Fig. 4. In a similar and oppositely-placed bearing portion $a^7$ in the standard $a'$ is a short spindle or arbor $h$, provided with a pinion $h'$, which is in constant mesh with the toothed portion $e'$ of the sector $e$. Permanently secured on the opposite end of said spindle or arbor $h$ by means of a set-screw $h^3$ or in any other well-known manner (see Fig. 4) is a cam-sleeve $h^4$, provided with gear-teeth $h^5$ and a pair of opposite spiral grooves $h^6$ in its cylindrical surface, as clearly indicated in Fig. 8. Surrounding said cylindrical part of said cam-sleeve $h^4$ is a bearing-ring $i$, in which said sleeve can freely rotate. Said ring $i$ is provided with a pair of perforated lugs $i'$, by means of which the said ring can be secured to the inner side of the standard $a'$ by the screws or bolts $i^2$, as will be clearly evident from Figs. 1, 6, and 7. Said sleeve or ring $i$ is also provided with a pair of oppositely-arranged grooves or slotted portions $i^3$, which form ways for a pair of guides $i^4$ and $i^5$, having pins or projections $i^7$, which extend into said spiral grooves $h^6$, as shown in said Figs. 6 and 7, and cause a partial rotation of the sleeve $h^4$ and the pinion $h'$ on the spindle $h$ in the manner and for the purposes to be more fully stated hereinafter. Each guide is provided with a pair of holding tongues or fingers $i^6$, arranged to embrace the opposite sides of a collar or projection $j'$ on a screw-threaded shaft or rod $j$, which rod has one of its ends squared and arranged in the squared socketed portion $g'$ of the spindle or arbor $g$, while its opposite end is loosely and rotatively arranged in a tubular part $h^7$ in the cam-sleeve $h^4$, as will be clearly evident from Figs. 1 and 3. Said shaft or rod $j$ has arranged on the screw-threaded part thereof a collar or nut $j^2$, having the forked arm $j^3$, which loosely embraces the screw-threaded shaft $f$, and near the socketed end $g'$ of the spindle $g$ said rod $j$ is provided with an enlargement $j^4$. While the forked arm $j^3$ of the collar $j^2$ loosely embraces the shaft $f$, as stated, the forked end or arm $f^3$ of the slide $f^2$ similarly and loosely embraces the said rod or shaft $j$.

I will now describe the operation of the above-described mechanism for actuating the knife-carrying disk to be fully described hereinafter.

Suppose the slide or collar $f^2$ is at that point on the screw-shaft $f$ indicated in dotted outline in Fig. 1 when the pulley-wheel $c^4$ on the shaft $c$ is operated. As soon as said pulley-wheel $c^4$ causes the rotation of the shaft $c$ the gear-wheel $c^5$ operates the gear $d'$ on the shaft $d$, and in consequence thereof causes the rotation of the two gears $e^4$ and $f'$, and hence turning the screw-shaft $f$.

As soon as the shaft $f$ turns, the slide or collar $f^2$ is caused to move forward on said shaft, being prevented from turning with the shaft by its forked arm $f^3$ striking the shaft or rod $j$, as will be clearly evident. When the said slide or collar $f^2$ arrives at the point indicated in Figs. 1 and 4 in full lines, it comes in contact with the slide or collar $j^2$ on the shaft or rod $j$, causing a longitudinal sliding movement of the latter in the portion $g'$ of the spindle $g$ and the tubular part $h^7$ of the cam-sleeve $h^4$. The pins $i^7$, hereinabove mentioned, immediately enter farther into the spiral grooves $h^6$ in said sleeve $h^4$, and thereby cause a partial rotation of the spindle $h$ and its pinion $h'$. This pinion $h'$ being in mesh with the teeth $e'$ of the sector $e$, the latter will immediately be moved on its pivotal support on the shaft $d$ in the direction of the arrow 3, (see Fig. 3,) whereby the gear or pinion $e^4$ is thrown out of mesh with the pinion $f'$, but still remains in operative engagement with the gear $d'$, while the idler $e^5$, which remains in mesh with the said pinion $e^4$, is now also thrown into operative engagement with the pinion $f'$. The force of power from the pulley-wheel $c^4$ is thus supplied to the shaft $f$ through the gears $c^5$, $d'$, $e^4$, $e^5$, and $f'$ instead of the gears $c^5$, $d'$, $e^4$, and $f'$, as heretofore, whereby a reversal of the direction of rotation of the said shaft $f$ is immediately caused, and the slide $f^2$ instantly returns to its former position on said shaft. As soon as the slide $f^2$ comes in contact with a stop $j^5$ on the shaft or rod $j$ the latter is moved longitudinally back to its former position, thereby causing the said sector $e$ to be moved in the direction of the arrow 4 in Fig. 3, whereby the idler $e^5$ is again disengaged from the pinion $f'$, and the gears will turn in the directions indicated by the several arrows in said Fig. 3, causing the opposite rotation of the shaft $f$, with the slide $f^2$ again moving toward the slide or nut $j^2$ on the shaft $j$, whereby the directions of rotation of the several parts are again reversed as soon as the two slides come in operative contact.

From the above description it will be evident that the direction of rotation of the shaft alternates in quick succession with a corresponding sliding and partial rotary movement of the shaft or rod $j$. In order to cause a positive engagement or contact of the gears $e^4$ and $e^5$ on the sector $e$ with the pinion $f'$, I have provided the device illustrated more particularly in Fig. 5, which consists of a toothed sector $k$, pivoted to the standard $a'$ on a pin $a^8$ thereon, which sector has gear-teeth $k'$, which mesh with the gear-teeth $h^5$ of the cam-sleeve $h^4$, as shown. Said sector $k$ is provided with the enlarged and heavier parts $k^2$ and $k^3$, and $k^4$ is a suitable tension-spring secured at the bottom to the sector and at the top to the standard $a'$ of the machine, substantially as illustrated in the several figures of the drawings. The normal tendency of said sector $k$ is to drop to either side of its pivotal support $a^8$ when the spindle $h$ is operated, and owing to such movement of the spring-actuated parts $k^2$ or $k^3$ on the sector $k$ the sector $e$ receives a more positive movement, and the several gears $e^4$, $e^5$, and $f'$ are positively engaged at the proper times without the least danger of reaching a point where both gears $e^4$ and $e^5$ would remain disengaged with the pinion $f'$. During the forward longitudinal movement of the shaft or rod $j$ a suitably-formed enlargement $j^4$ on said shaft comes in sliding engagement with a pawl-lever $l$, actuated by a spring $l'$ and pivoted on a pin $l^2$ in the cross-piece $a^9$ of the frame A of the machine, as clearly indicated in Fig. 13.

On the shaft $d$ is a ratchet-wheel $d^2$ and a loose gear $d^3$, having the shell-like part $d^4$, which forms a chamber over the said ratchet-wheel $d^2$. In said shell is a pivotally-arranged dog or small pawl $d^5$, the nosing $d^6$ of which is forced into locked engagement with said ratchet-wheel by the action of a spring $d^7$, as clearly shown. Thus it will be evident that when the nosing $l^3$ of the pawl $l$ is forced from operative engagement with the dog $d^5$, as soon as the projection $j^4$ on the shaft $j$ operates said pawl, as indicated in said Fig. 13, then the dog $d^5$ causes the ratchet-wheel $d^2$ to rotate with the shaft $d$ to operate the gear $d^3$. Said gear $d^3$ meshes with a gear $m'$ on a shaft $m$ in the standard $a$, having a miter-gear $m^2$ at its opposite end, which meshes with a miter-gear $n'$ on a shaft $n$, adapted to rotate in suitable bearings in the brackets $o$ and $o'$, secured to the side of the standard $a$, as clearly indicated in Fig. 1. On said shaft $n$, directly above the upper bracket $o'$, is a suitable disk $n^2$, (see Figs. 1, 10, and 11,) having a knife or cutter $p$ suitably secured thereon. Said disk $n^2$ is also provided with a pair of perforated lugs or ears $n^3$, and on a pin $r'$ in said lugs is secured a rod or bar $r$, having an actuating-spring $r^2$, which normally holds said rod or bar in the position indicated in Fig. 11. Said rod or bar $r'$ is provided with a short cam-shaped spur $r^3$, which during the rotation of said disk $n^2$ at first enters an eccentric groove $o^2$ in the bracket $o'$, but soon comes in contact with the sides and lower surface of said groove, whereby the said rod or bar $r$ is caused to make a sudden forward movement after it has entered about half-way into the discharge-opening $s'$ of the mold or former $s$ (see Fig. 14) to throw or force the cut portion of the dough from the mouth of said former, in the manner and for the reason to be more fully stated hereinafter.

The former or mold $s$ is provided with the angularly-shaped ways $s^2$, which slide into correspondingly-formed ways or grooves in the standard $a$, and in this manner the former or mold can be securely but removably arranged to form the discharge-opening of the machine, as clearly illustrated in Fig. 2. As will be seen from said Fig. 2 and from Figs. 10, 11, and 14, each mold or former $s$ has the oppositely-arranged cut-away and circularly-formed parts $s^3$, into which said disk $n^2$, the cutter or knife $p$, and the rod or bar $r$ enter in the manner indicated in said Figs. 10 and 11.

The machine is operated in the following manner: The dough, which is placed in the hopper of the machine, is conveyed by the rotating worm or conveyer $c'$ into and out of the discharge-opening in the former or mold $s$. At the same time the several gears hereinabove mentioned operate the shafts $f$ and $j$ and their respective slides in the manner stated, and the enlargement $j^4$ on the shaft or rod $j$ causes, through the arrangement of the intermediately-placed mechanism on the shaft $d$, an intermittent rotation of the disk $n^2$ at stated intervals, according to the distance between the slide $j^2$ and the stop $j^5$ on the shaft $j$. At the same time the knife or cutter $p$, which is connected with the disk $n^2$, is brought at intervals against the dough and cuts into and through the same as it is forced from the mouth of the former $s$. As soon as the knife or cutter $p$ has cut to a depth of about one-half the thickness of the portion of dough the rod or bar $r$ enters the cut, and as soon as the knife has passed entirely through the dough then said rod or bar is actuated by the cam-shaped spur $r^3$ by coming in contact with the groove in the bracket $o'$, whereby it receives a sudden forward motion, and the cut portion of the dough is quickly thrown on a table at the side of the machine, where it is taken up by the baker previous to the baking operation.

The action of the knife or cutter-disk and the parts connected therewith is intermittent and corresponds with the change of action in the shafts $f$ and $j$ and the intermediately-arranged operating mechanism and is very quickly performed, whereby the portions of dough are rapidly cut and are all of the required size and weight. The intermittent rotary action of the disk $n^2$ and its knife $p$ and bar $r$ can be changed to cut smaller or larger portions of dough, as may be desired by the baker, in making rolls or short or long loaves of bread by turning a hand-wheel $t$, operating a rod $t'$ and worm $t^2$, either to the left or right, said worm engaging with the gear-teeth $g^2$ of the spindle $g$, thereby turning the screw shaft or rod $j$ in either direction and moving the forked slide or nut $j^2$ either to the left or the right on said rod $j$, and thereby reducing or increasing the limit of travel of the slide $f^2$ on the shaft $f$, as will be clearly understood.

According to the distance of travel of the slide $f^2$ made on its shaft $f$ between the slide or nut $j^2$ and the stop $j^5$ on the shaft or rod $j$, the gear-wheel $d^5$ on the shaft $d$ is correspondingly actuated, and said disk $n^2$ and its knife $p$ and rod or bar $r$ rotate fast to cut small portions of dough or operate very slowly to cut large portions of dough.

My present invention provides a simply constructed and operative machine which is well adapted for producing at a greatly-reduced cost in labor portions of dough of any desired size and weight. I am fully aware that many changes may be made in the details of construction and the combinations of parts without departing from the scope of my invention. I therefore do not limit myself to the exact arrangements and construction of the parts as herein described and illustrated.

The dough former or mold $s$ is removably arranged in the standard $a$ of the machine, whereby different-sized formers can be placed in the machine, as will be clearly evident.

Having thus described my invention, what I claim is—

1. In a dough-cutting machine, a casing, having a discharge-opening, a conveyer in said casing, means for operating said conveyer, a dough former or mold in said discharge-opening, and mechanism adapted to separate the dough in equal portions as it is discharged from said former or mold, comprising a disk $n^2$, means for operating the same, and a vertically-arranged knife $p$ on said disk, substantially as and for the purposes set forth.

2. In a dough-cutting machine, a casing having a discharge-opening, a conveyer in said casing, means for operating said conveyer, a dough former or mold in said discharge-opening, mechanism adapted to separate the dough in equal portions as it is discharged from said former or mold, comprising a disk $n^2$, means for operating the same, a vertically-arranged knife, and a bar $r$ on said disk, and means acting to force each cut portion of dough from the mouth of said former or mold, substantially as and for the purposes set forth.

3. In a dough-cutting machine, a casing having a discharge-opening, a conveyer in said casing, means for operating said conveyer, a dough former or mold in said discharge-opening, a screw-shaft $f$ and slide $f^2$ thereon, means for operating said shaft, a second shaft or rod $j$ and slide $j^2$ thereon, a knife or cutter adapted to cut the dough in equal portions as it is discharged from said former or mold, and means connected with said shaft $j$ for causing a rotary motion of said knife or cutter, substantially as and for the purposes set forth.

4. In a dough-cutting machine, a casing having a discharge-opening, a conveyer in said casing, means for operating said conveyer, a dough former or mold in said discharge-opening, a screw-shaft $f$ and slide $f^2$ thereon, means for operating said shaft, a second shaft or rod $j$ and slide $j^2$ thereon, a knife or cutter adapted to cut the dough in equal portions as it is discharged from said former or mold, and means connected with said shaft $j$ for causing a rotary motion of said knife or cutter, consisting, essentially, of a shaft $d$, a ratchet-wheel thereon, a spring-actuated pawl $d^5$, a spring-actuated pawl-lever $l$, actuated from said shaft or rod $j$, a gear-wheel $d^3$, shaft $m$ and gears $m'$ and $m^2$, shaft $n$, gear $n'$, and a disk $n^2$ on which said knife or cutter is arranged, substantially as and for the purposes set forth.

5. In a dough-cutting machine, a casing having a discharge-opening, a conveyer in said casing, means for operating said conveyer, a dough former or mold in said discharge-opening, a screw-shaft $f$ and slide $f^2$ thereon, means for operating said shaft, a second shaft or rod $j$ and slide $j^2$ thereon, a knife or cutter adapted to cut the dough in equal portions as it is discharged from said former or mold, and means connected with said shaft $j$ for causing a rotary motion of said knife or cutter, consisting, essentially, of a shaft $d$, a ratchet-wheel thereon a spring-actuated pawl $d^5$, a spring-actuated pawl-lever $l$, actuated from said shaft or rod $j$, a gear-wheel $d^3$, shaft $m$ and gears $m'$ and $m^2$, shaft $n$, gear $n'$, a disk $n^2$ on said shaft $n$ having lugs or ears $n^3$, and a rod or bar $r$ pivoted between said lugs or ears, adapted to be actuated and forced against each cut portion of dough and push it from the discharge-opening, substantially as and for the purposes set forth.

6. In a dough-cutting machine, the combination, with the frame thereof, of a casing having a discharge-opening, a shaft $c$, a conveyer thereon, and means for operating the same, gear $c^5$ on said shaft $c$, a shaft $d$ and gear $d'$, a toothed sector $e$ pivotally arranged on said shaft $d$, gears $e^4$ and $e^5$ on said sector, a spindle $h$ and pinion $h'$ thereon, a screw-shaft $f$, a slide $f^2$ and gear $f'$, a spindle $g$, a cam-sleeve $h^4$, a shaft or rod $j$ having a slide $j^2$ thereon, said shaft $j$ having its ends arranged in tubular portions in said spindle and cam-sleeve, and adapted for a longitudinally-sliding motion therein, a knife or cutter adapted to cut the dough in equal portions as it is discharged from the discharge-opening, and means connected with said shaft $j$ for causing a rotary motion of said knife or cutter, substantially as and for the purposes set forth.

7. In a dough-cutting machine, the combination, with the frame thereof, of a casing having a discharge-opening, a shaft $c$ a conveyer thereon, and means for operating the same, gear $c^5$ on said shaft $c$, a shaft $d$ and gear $d'$, a toothed sector $e$ pivotally arranged on said shaft $d$, gears $e^4$ and $e^5$ on said sector, a spindle $h$ and pinion $h'$ thereon, a screw-shaft $f$, a slide $f^2$ and gear $f'$, a spindle $g$, a cam-sleeve $h^4$, a shaft or rod $j$ having a slide $j^2$ thereon, said shaft $j$ having its ends arranged in tubular portions in said spindle and cam-sleeve, and adapted for a longitudinally-sliding motion therein, a knife or cutter adapted to cut the dough in equal portions as it is discharged from the discharge-opening, and means connected with said shaft $j$ for causing a rotary motion of said knife or cutter, consisting essentially, of a ratchet-wheel on said shaft $d$, a spring-actuated pawl $d^5$, a spring-actuated pawl-lever $l$, actuated from said shaft or rod $j$, a gear-wheel $d^3$, shaft $m$ and gears $m'$ and $m^2$, shaft $n$, gear $n'$, and a disk $n^2$ on which said knife or cutter is arranged, substantially as and for the purposes set forth.

8. In a dough-cutting machine, the combination, with the frame thereof, of a casing having a discharge-opening, a shaft $c$, a conveyer thereon, and means for operating the same, gear $c^5$ on said shaft $c$, a shaft $d$ and gear $d'$, a toothed sector $e$ pivotally arranged on said shaft $d$, gears $e^4$ and $e^5$ on said sector, a spindle $h$ and pinion $h'$ thereon, a screw-shaft $f$, a slide $f^2$ and gear $f'$, a spindle $g$, a cam-sleeve $h^4$, a shaft or rod $j$ having a slide $j^2$ thereon, said shaft $j$ having its ends arranged in tubular portions in said spindle and cam-sleeve, and adapted for a longitudinally-sliding motion therein, a knife or cutter adapted to cut the dough in equal portions as it is discharged from the discharge-opening, and means connected with said shaft $j$ for causing a rotary motion of said knife or cutter, consisting, essentially, of a ratchet-wheel on said shaft $d$, a spring-actuated pawl $d^5$, a spring-actuated pawl-lever $l$, actuated from said shaft or rod $j$, a gear-wheel $d^3$, shaft $m$ and gears $m'$ and $m^2$, shaft $n$, gear $n'$, a disk $n^2$ on said shaft $n$ having lugs or ears $n^3$, and a rod or bar $r$ pivoted between said lugs or ears, adapted to be actuated and forced against each portion of dough and push it from the discharge-opening, substantially as and for the purposes set forth.

9. In a dough-cutting machine, the combination, with the machine-frame, a casing, a shaft $c$ and a conveyer thereon, and the shafts $d$, $f$ and $j$, of a gear mechanism for operating said shafts, consisting, essentially, of a gear $c^5$ on the shaft $c$, gear $d'$ and a pivoted toothed sector $e$ on said shaft $d$, gears $e^4$ and $e^5$ on said sector, gear $f'$ on shaft $f$, spindle $h$ and a pinion $h'$ thereon adapted to be operated from said shaft $j$, all arranged and operating, substantially as and for the purposes set forth.

10. In a dough-cutting machine, the combination, with the machine-frame, a casing, a shaft $c$ and a conveyer thereon, and the shafts $d$, $f$ and $j$, of a gear mechanism for operating said shafts, consisting, essentially, of a gear $c^5$ on the shaft $c$, gear $d'$ and a pivoted toothed sector $e$ on said shaft $d$, gears $e^4$ and $e^5$ on said sector, gear $f'$ on shaft $f$, a spindle $h$ and pinion $h'$ thereon, a cam-sleeve $h^4$ adapted to be actuated by said shaft $j$, gear-teeth $h^5$ on said sleeve and a pivotally-arranged sector $k$ having gear-teeth $k'$ meshing with the teeth on said sleeve $h^4$, all substantially as and for the purposes set forth.

11. In a machine of the class herein set forth, the combination, with a screw shaft or rod $j$, of a spindle $h$, a cam-sleeve on said spindle having grooves $h^6$, a sleeve or shell $i$, provided with grooves $i^3$, guides $i^4$ and $i^5$ sliding in said grooves, provided with pins $i^7$ and projections $i^6$, said pins $i^7$ projecting into said grooves $h^6$, and said projections $i^6$ being adapted to engage with a collar or projection $j'$ on said shaft $j$, substantially as and for the purposes set forth.

12. In a machine of the class herein set forth, the combination, with a screw shaft or rod $j$, of a spindle $h$, a cam-sleeve on said spindle having grooves $h^6$, a sleeve or shell $i$, provided with grooves $i^3$, guides $i^4$ and $i^5$ sliding in said grooves, provided with pins $i^7$ and projections $i^6$, said pins $i^7$ projecting into said grooves $h^6$, and said projections $i^6$ being adapted to engage with a collar or projection $j'$ on said shaft $j$, and means for actuating said shaft or rod $j$, consisting, essentially, of a screw-threaded shaft $f$ and a slide $f^2$ thereon, and a gear mechanism for operating said shaft $f$, substantially as and for the purposes set forth.

13. In a dough-cutting machine, the combination, with the machine-frame, and a casing, as $b$, having a discharge-opening, of a dough former or mold $s$ in said discharge-opening, having cut-away portions $s^3$, a shaft $n$ in bearings $o$ and $o'$ on said machine-frame, a disk $n^2$ on said shaft $n$, and a knife or cutter, as $p$, on said disk, substantially as and for the purposes set forth.

14. In a dough-cutting machine, the combination, with the machine-frame, and a casing, as $b$, having a discharge-opening, of a dough former or mold $s$ in said discharge-opening, having cut-away portions $s^3$, a shaft $n$ in bearings $o$ and $o'$ on said machine-frame, a disk $n^2$ on said shaft $n$, and a knife or cutter $p$ on said disk, a pair of lugs $n^3$ on said disk, and a spring-actuated bar or rod $r$ pivoted between said ears or lugs, and a spur $r^3$ on said bar or rod $r$ adapted to engage with an eccentric groove $o^2$ in said bracket $o'$, substantially as and for the purposes set forth.

In testimony that I claim the invention set forth above I have hereunto set my hand this 20th day of June, 1896.

JAMES PARK.

Witnesses:
FREDK. C. FRAENTZEL,
WM. H. CAMFIELD, Jr.